United States Patent [19]

DeVlieg

[11] 4,198,102

[45] Apr. 15, 1980

[54] AUTOMATIC SYSTEM PRESSURE SHUT OFF VALVE FOR ANTI-SKID CONTROL SYSTEM

[75] Inventor: Garrett H. DeVlieg, Bellevue, Wash.

[73] Assignee: The Boeing Company, Seattle, Wash.

[21] Appl. No.: 949,597

[22] Filed: Oct. 10, 1978

[51] Int. Cl.² .............................................. B60T 8/02
[52] U.S. Cl. ..................................... 303/92; 244/111; 303/93; 303/117
[58] Field of Search ............. 244/111, 110 A; 303/93, 303/94, 98, 113–119, 61–63, 68–69, 112, 102, 10, 6 R, 92; 188/181 A

[56] References Cited

U.S. PATENT DOCUMENTS

| 3,486,801 | 12/1969 | Frayer | 303/117 |
|---|---|---|---|
| 3,671,082 | 6/1972 | Stevens | 244/111 |
| 4,053,187 | 10/1977 | Cook | 303/93 |

Primary Examiner—Douglas C. Butler
Attorney, Agent, or Firm—Conrad O. Gardner; B. A. Donahue

[57] ABSTRACT

An anti-skid valve in an aircraft braking system achieving advantages by the application of hydraulic system pressure, rather than metered braking pressure, to the first stage of a two stage anti-skid valve. When the valve is not in use the quiescent flow tends to erode the first stage valve, thereby degrading performance. The present system shutoff valve eliminates this disadvantage by shutting off system pressure to the valve whenever the brakes are not in use, as indicated by the absence of metered braking pressure.

2 Claims, 2 Drawing Figures

AUTOMATIC SYSTEM PRESSURE SHUT OFF VALVE FOR ANTI-SKID CONTROL SYSTEM

BACKGROUND OF THE INVENTION

The present invention relates to the field of hydraulic servo valves, particularly to two-stage pressure control type servo valves utilized in braking systems which incorporate anti-skid controls. Such valves have a history of degrading due to hydraulic erosion of the first stage when the valve is subjected to full system pressure when it is not in use and/or is delivering at low pressures relative to system pressure; i.e. there is a high pressure drop at low flow levels.

One known solution to this erosion problem is to shut off system pressure to the valve when it is not in use. However, doing so manually has been found unacceptable because of the extra time and attention required to do so, particularly when use requirements occur suddenly, unexpectedly or when the operator's efforts and attention are devoted to more demanding requirements. Therefore prior art has provided pressure turn on and off automatically in various ways as exemplified by U.S. Pat. No. 4,003,400 assigned to The Boeing Company. Pressure flow to this valve is turned on and off in response to the rate of flow of fluid through the valve. This technique is not applicable to anti-skid valves since they are predominantly for pressure control and flow is limited and incidental. Another known system employs a hydraulically actuated on-off valve with the control connected to a hydraulic system which is pressurized in order to extend the landing gear of an airplane. The on-off valve feeds pressure to the anti-skid valve in response to the pressurization of the gear extension system. This system is not satisfactory for two main reasons. First, the anti-skid valve is subject to system pressure for much more time than that during which the brakes function. Second, and more important, if the hydraulic system which extends the gear should fail, the gear can be extended by emergency means without hydraulic pressure and the anti-skid system would be inoperative without this pressure to actuate the on-off valve to the anti-skid valve. This problem of loss of anti-skid control because of loss of hydraulic supply to the first stage of the anti-skid valve can occur with whatever source, not just with the landing gear extend source. Another problem in known systems is that failure of the valve controlling pressure to the first stage will also prevent application of pressure to the first stage when needed and thus prevent anti-skid control.

It is further known that aircraft braking systems typically employ anti-skid systems to prevent tire skidding during heavy braking. These systems control brake pressure by means of an electrically controlled anti-skid valve which reduces or completely releases brake pressure when a skid is detected and then allows braking pressure to be reapplied when it has been detected that the tire/ground friction has spun the wheel back up.

In most aircraft anti-skid systems these valves are two-stage pressure control valves. The first stage typically employs an electro-hydraulic torque motor to convert the electrical brake pressure command signal to a low power hydraulic pressure. The second stage typically employs a hydraulic metering spool which directly controls the brake pressure in response to the low power hydraulic pressure from the first stage.

Although such anti-skid valves utilize the hydraulic pressure metered by the pilot's pedal operated brake metering valve to power both the first and second stages of the anti-skid valve, the type of anti-skid valve in accordance with the present embodiment of the invention utilizes hydraulic system supply pressure, which remains relatively constant at all times, to power the first stage, and meters the pilot's metered pressure, which varies according to the level of braking commanded by the pilot, to the second stage.

The pressure embodiment offers advantages to the anti-skid system in that significant improvements in anti-skid control are allowed whenever the pilot's metered pressure is varied. A problem with the aforementioned type valves is that when the valve is not in use, the quiescent flow from the system supply pressure through the first stage torque motor tends to erode the first stage, thereby degrading its performance.

A means to solve this problem includes the insertion of an electrically operated shutoff valve in the hydraulic supply line to the first stage. This valve is then coupled to a switch in the aircraft which detects landing gear extension so that hydraulic power is applied to the first stage only when the landing gear is extended. This design has problems in that landing gear operated shutoff valve adds significantly to the complexity of the anti-skid system, can allow erosion of the anti-skid valve first stage whenever the landing gear is extended, and could have a tendency toward failure in the closed position causing loss of braking capability or loss of anti-skid protection. An embodiment of the present invention comprises a shutoff valve in the supply line to the anti-skid valve first stage which overcomes the problems of prior shutoff valves. The present embodiment of the invention utilizes a valve which is a hydraulically operated, spring biased shutoff valve which is actuated by the pilot's metered braking pressure so that the valve opens and allows hydraulic system pressure to power the anti-skid valve first stage whenever the pilot meters braking pressure, and then closes to shut off the first stage when the pilot releases braking pressure. A hydraulic check valve is located between the pilot's metered pressure and the first stage supply pressure so that, should the shutoff valve fail closed, the pilot's metered pressure can power the anti-skid valve first stage, yet, when the shutoff valve opens, the system supply pressure cannot be ported to the brakes. This check valve insures that the brakes can be applied and anti-skid control retained even when the aforementioned shutoff valve fails in the closed position.

The significant contribution and consequent inherent advantages of this valve configuration include:

(1) the valve is simple and requires no interface with other aircraft systems such as a landing gear extension system, (2) the valve only opens when the pilot meters pressure, instead of whenever the landing gear is extended, so that first stage erosion of the anti-skid valve is minimized, and (3) the check valve of the present system embodiment prevents failures which prevent braking or cause loss of anti-skid protection.

SUMMARY OF THE INVENTION

Therefore it is an object of this invention to provide hydraulic system pressure to the first stage of an anti-skid valve only when it is needed. Another object is to prevent complete loss of anti-skid control if the hydraulic system pressure fails. It is a further object to provide that in the event of jamming of the on-off valve, either on or off, such event will not prevent anti-skid control of the braking. Still another object is that no single failure of the present embodiment valve arrangement will allow pressure to be applied to the brakes sufficient to cause brake heating but not sufficient to cause it to be clearly evidence that the brakes are applied.

In accordance with these objects and in the disclosed preferred embodiment of the invention pressure applied to the brakes as a result of pressure on the brake pedal is tapped off to operate an on-off valve which controls application of system pressure to the first stage of the anti-skid valve(s). Thus the system pressure is on only when the brakes are in use. Further, a check valve allows brake pressure to be bled to the first stage in the event that system pressure is not available. This check valve also allows anti-skid control in the event that the valve malfunctions by jamming of the slide in the sleeve. The valve allows metered pressure in the brake line to feed the first stage of the multi-stage valve. Further, the concept allows one on-off valve to serve several anti-skid valves. Also, there is a flow restriction in the system pressure port so that, in the event of any failure which allows flow from the pressure port to the brake metered pressure port, the restriction will reduce system pressure to a level so low that the brakes will not be applied.

DESCRIPTION OF THE PREFERRED EMBODIMENT

Figure 1:
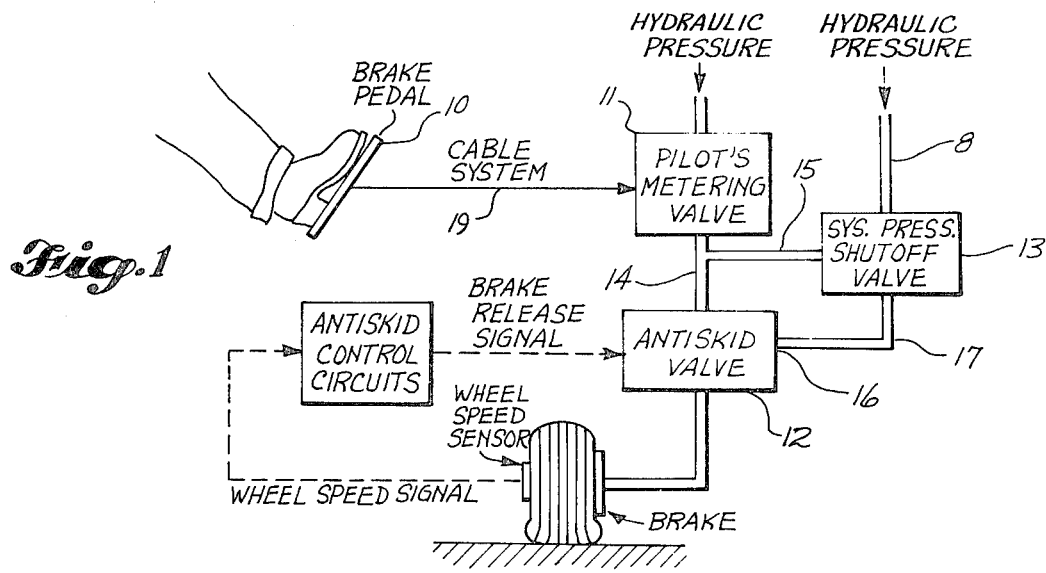
FIG. 1 schematically illustrates the present shutoff valve arrangement in an aircraft braking system incorporating anti-skid control utilizing an anti-skid servo valve in which the first stage is connected to a hydraulic system.

Referring to FIG. 1, for brake application, force is applied to the brake pedal 10. The force is transmitted to hydraulic pressure metering valve 11 (brake metering valve) via a cable system 9. Valve 11 is connected to a hydraulic system and delivers hydraulic pressure (along with whatever flow is required) proportional to the force applied on the pedal 10. The pressure from the metering valve is directed to the anti-skid valve 12 and the subject valve 13 via lines 14 and 15. As explained hereinafter in more detail, application of pilot metered pressure above a certain level causes valve 13 to open and admit pressure (and flow) from a hydraulic system in line 8 to line 17, and thereby to the port 16 on anti-skid valve 12. Port 16 admits anti-skid valve reference pressure to the first stage of the anti-skid servo valve and to balance area 40 on the control spool 42 of the anti-skid valve (see FIG. 2). Pilot's metered pressure in line 14 is ported only to inlet port 44 on the anti-skid valve metering spool 42. This ensures that the pressure to the brakes cannot exceed the pilot's metered pressure and metered pressure variations cannot affect pressure to the anti-skid valve first stage or to balance area 40 on spool 42 to interfere with anti-skid braking control.

Figure 2:
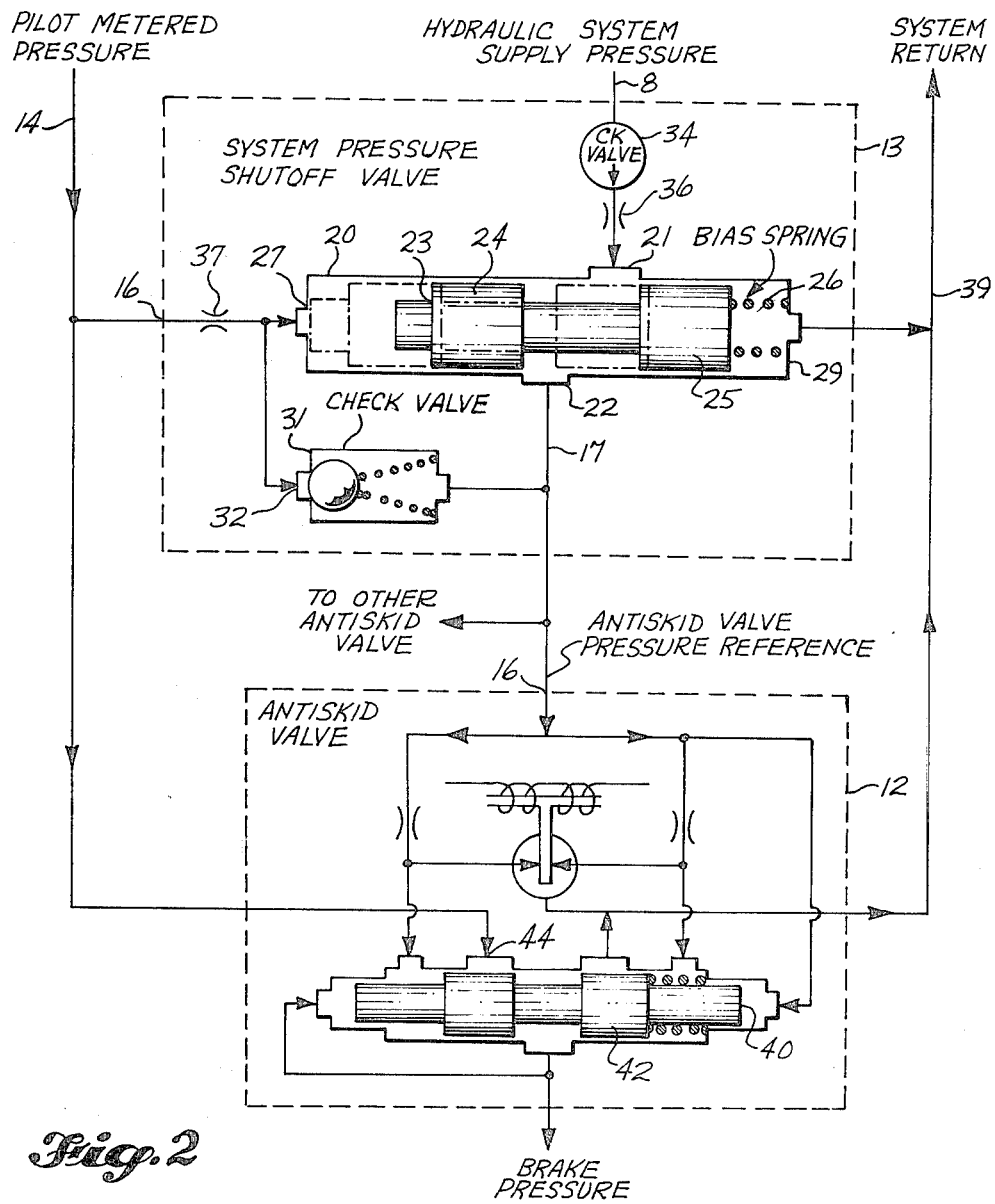
FIG. 2 schematically illustrates the shutoff valve and anti-skid valve shown in the system of FIG. 1.

Referring to FIG. 2 subject valve 13 is shown having sleeve 20 with port 21 coupled to a hydraulic system supply pressure line 8 and port 22 connected via line 17 to port 16, the anti-skid valve reference pressure input to the first stage of anti-skid valve 12. Slide 23 in sleeve 20 has two lands, 24 and 25 and is urged by spring 26 toward end 27 of sleeve 20, as indicated by the dotted outline. In this position land 25 closes off port 21 and thereby closing off hydraulic system supply pressure to the first stage of the anti-skid valve. Pilot metered pressure in line 14, from the brake metering valve 11 of FIG. 1, is ported to end 27 of shutoff valve 13 via port 16. When the pressure is increased so that the pressure force on the slide overcomes the spring force, slide 23 moves to the position shown by the solid line and causing the hydraulic system supply pressure at port 21 to be made available to the anti-skid valve at line 17. End 29 of sleeve 20 is ported to hydraulic system return line 39 so that hydraulic pressure cannot build up at that end to limit motion of slide 23.

Check valve 31 in valve 14 is ported at its input 32 to pilot metered pressure in line 14 and at its output to anti-skid valve reference pressure in line 17. Thus metered pressure is always routed to the anti-skid control valve first stage until metered pressure moves slide 23 to port hydraulic system supply pressure to the anti-skid valve first stage instead. If the hydraulic system supplying valve 13 were to be lost, a loss of anti-skid control which could result is prevented because pilot metered pressure would then exceed hydraulic system supply pressure and check valve 31 would open to allow hydraulic flow at brake metered pressure to reach the anti-skid valve first stage. It is well known in the art that anti-skid control with variable brake metering pressure, instead of relatively constant system pressure, applied to the first stage is not as efficient, as with system pressure. However it is acceptable and allows brake application capability and anti-skid protection to be retained. Check valve 34 and/or fluid flow restrictor 36 prevents the brake metered hydraulic flow from being lost to the failed system if failure is caused by a leak. Similarly if slide 23 should jam in the dotted position, shutting off system pressure when it is needed, check valve 31 again allows sufficient flow for anti-control valve function.

Restrictor 37 in the input passage from port 16 to check valve 31 restricts flow to prevent excessive loss of brake metering pressure and flow, and braking, in the event of a failure which vented the volume between lands 24 and 25 to return port or to ambient. In such a failure restrictor 36 would serve to limit losses from the hydraulic system.

If there should be a failure inside valve 13, such as a failed seal or a cracked valve casing, which allowed pressure/flow from the hydraulic system supply pressure to be coupled to port 16 and the brake metered pressure line 14, either restrictor 36 or 37 would limit the flow rate to a level which line 14 can accommodate as it returns the flow to system return through the pilot's metering valve 11 of FIG. 1 without reaching pressure levels which could cause the brakes to be inadvertently applied.

It is evident from the preceding that harmful quiescent flow which tends to erode the first stage valve in the anti-skid control valve is limited to a minimum, occurring only when the brakes are in use. Also, if the hydraulic system pressure supplying the first stage of the anti-skid control valve fails, metered brake pressure is automatically substituted, resulting only in a loss of braking efficiency, but not resulting in a loss of ability to apply the brake or prevent tire skids. No single hydraulic failure can apply the brakes inadvertently. Jamming of the subject valve in any position cannot prevent operation of the anti-skid control valve. Further, a single shutoff valve can be ported to one or several anti-skid valves, thereby simplifying the overall braking system.

What is claimed is:

1. A vehicle skid control system comprising:
a skid control circuit for providing a skid control signal;
means for providing a supply of hydraulic fluid at substantially constant pressure;
means for providing hydraulic fluid at variable metered pressure;
brake pressure valving means responsive to said skid control signal, said hydraulic fluid at substantially constant pressure, and said hydraulic fluid at variable metered pressure for producing a brake output pressure which is determined by the lower of either of said metered pressure or pressure commanded by said skid control signal; and,
shutoff valve means disposed between said means for providing a supply of hydraulic pressure at substantially constant pressure and said brake pressure valving means, said shutoff valve means responsive to said variable metered pressure for shutting off said substantially constant pressure applied to said brake pressure valving means when said variable metered pressure is less than a predetermined level.

2. A vehicle skid control system comprising:
a skid control circuit for providing a skid control signal;
means for providing a supply of hydraulic fluid at substantially constant pressure;
means for providing hydraulic fluid at variable metered pressure;
brake pressure valving means responsive to said skid control signal, said hydraulic fluid at substantially constant pressure, and said hydraulic fluid at variable metered pressure for producing a brake output pressure which is determined by the lower of either of said metered pressure or pressure commanded by said skid control signal;
shutoff valve means disposed between said means for providing a supply of hydraulic pressure at substantially constant pressure and said brake pressure valving means; and
check valve means responsive to said hydraulic fluid at variable metered pressure for providing said hydraulic fluid at variable metered pressure to said brake pressure valving means instead of said hydraulic fluid at substantially constant pressure when said shutoff valve means is in a shutoff condition.

* * * * *